(12) United States Patent
Gauthier et al.

(10) Patent No.: US 6,188,241 B1
(45) Date of Patent: Feb. 13, 2001

(54) MICROCONTROLLER HAVING A BLOCK OF LOGIC CONFIGURABLE TO PERFORM A SELECTED LOGIC FUNCTION AND TO PRODUCE OUTPUT SIGNALS COUPLED TO CORRESPONDING I/O PADS ACCORDING TO A PREDEFINED HARDWARE INTERFACE

(75) Inventors: Lloyd W. Gauthier, Austin, TX (US); Carl K. Wakeland, Scotts Valley, CA (US); Faheem Hayat, Round Rock; David F. Tobias, Pflugerville, both of TX (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 09/311,448

(22) Filed: May 14, 1999

(51) Int. Cl.$^7$ ................................................. H03K 19/177
(52) U.S. Cl. ................................................. 326/41; 326/38
(58) Field of Search ................................. 326/41, 47, 39, 326/38, 101; 395/733, 284, 800.01

(56) References Cited

U.S. PATENT DOCUMENTS

| | | | |
|---|---|---|---|
| 5,757,207 | * | 5/1998 | Lytle et al. ............................... 326/39 |
| 5,768,598 | * | 6/1998 | Marisetty et al. ..................... 395/733 |
| 5,883,526 | * | 3/1999 | Reddy et al. ........................... 326/41 |

* cited by examiner

Primary Examiner—David Nelms
Assistant Examiner—David Lam
(74) Attorney, Agent, or Firm—Kevin L. Daffer; Conley, Rose & Tayon

(57) ABSTRACT

A microcontroller is presented having a block of logic configurable to perform a selected logic function and to produce output signals coupled to corresponding I/O pads according to a predefined hardware interface. The microcontroller includes a central processing unit (CPU), a first set of I/O pads, and a configurable logic block (CLB) all formed upon a single monolithic semiconductor substrate. The CPU is configured to execute instructions, preferably x86 instructions. The CPU produces CPU output signals during instruction execution. The CLB is coupled between the CPU output signals and the first set of I/O pads, and is configurable to perform a logic function selected from a predefined set of logic functions. Each member of the set of logic functions has an associated hardware interface including a signal table which defines a correspondence between CLB input/output signals and members of the first set of I/O pads. The microcontroller also preferably includes a test/program core coupled to a second set of I/O pads and to the CLB. The test/program core produces programming signals in response to signals received via the second set of I/O pads. The programming signals cause the CLB to perform the selected logic function. When programmed, the CLB produces CLB output signals in response to the CPU output signals. Each of the CLB output signals is coupled to one or more of the members of the first set of I/O pads according to the hardware interface of the selected logic function.

28 Claims, 3 Drawing Sheets

MICROCONTROLLER HAVING A BLOCK OF LOGIC CONFIGURABLE TO PERFORM A SELECTED LOGIC FUNCTION AND TO PRODUCE OUTPUT SIGNALS COUPLED TO CORRESPONDING I/O PADS ACCORDING TO A PREDEFINED HARDWARE INTERFACE

BACKGROUND OF THE INVENTION

1. Field of the Invention

This invention relates to the manufacture of digital integrated circuits, and more particularly to the fabrication of microcontrollers.

2. Description of the Relevant Art

A typical computer system includes a microprocessor secured within its own semiconductor device package and coupled to several separately-packaged support devices. The support devices form circuits which perform support functions including communication functions and memory interface functions. A microcontroller is an integrated circuit which incorporates a microprocessor core along with one or more support circuits on the same monolithic semiconductor substrate (i.e., chip). Computer systems which employ microcontrollers may thus be formed using fewer semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives.

During manufacture of an integrated circuit (e.g., a microcontroller), signal lines formed upon the silicon substrate which are to be connected to external devices are terminated at flat metal contact regions called input/output (I/O) pads. The I/O pads are typically arranged about the periphery of the chip. Following manufacture, the integrated circuit is typically secured within a protective semiconductor device package. Each I/O pad of the chip is then connected to a terminal of the device package. The I/O pads of the chip are typically attached to the terminals of the device package by fine metal wires. Some types of device packages have terminals called "pins" for insertion into holes in a printed circuit board (PCB). Other types of device packages have terminals called "leads" for attachment to flat metal contact regions on an exposed surface of a PCB.

As integrated circuit fabrication technology improves, manufacturers are able to integrate more and more functions onto single silicon substrates. As the number of functions on a single chip increases, however, the number of signal lines which need to be connected to external devices also increases. The corresponding numbers of required I/O pads and device package terminals increase as well, as do the complexities and costs of the device packages. As there are practical lower limits to the sizes of and distances between device package terminals, the sizes of device packages having hundreds of terminals are largely proportional to the required number of terminals. PCBs having multiple layers of closely-spaced conductive traces are required to accommodate such device packages. Attaching such device packages to PCBs also requires special tools and skills. Thus although increased integration reduces the manufacturing costs of integrated circuits, the costs of manufacturing systems which employ such integrated circuits often increase.

In an effort to reduce integrated circuit and system manufacturing costs, integrated circuit manufacturers are always looking for ways to reduce the number of required device package terminals. One common method of reducing the number of required device package terminals is to have two or more functions share selected device package terminals where possible. FIG. 1 is a block diagram of a microcontroller 10 which employs such a device package terminal sharing (i.e., multiplexing) approach. Microcontroller 10 includes a first logic network 12 and a second logic network 14 coupled to an internal bus 16. First logic network 12 and second logic network 14 share a set of I/O pads 18 via select logic 20. Select logic 20 is coupled to first logic network 12, second logic network 14, internal bus 16, and I/O pads 18, and includes signal multiplexing and buffering circuitry. In response to control signals received via internal bus 16, select logic 20 connects signal lines from either first logic network 12 or second logic network 14 to I/O pads 18. First logic network 12 may be, for example, a liquid crystal display (LCD) driver circuit. Second logic network 14 may be, for example, a Video Electronics Standards Association (VESA) local bus (i.e., VL bus) controller. When an LCD display device is coupled to I/O pads 18, microcontroller 10 is initialized with first logic network 12 (i.e., the LCD display driver circuit) enabled and second logic network 14 (i.e., the VL bus controller circuit) disabled. Select logic 20 couples signal lines from first logic network 12 to I/O pads 18 in order to control the LCD display device. When I/O pads 18 are coupled to the VL bus, microcontroller 10 is initialized with second logic network 14 enabled and first logic network 12 disabled. Select logic 20 couples signal lines from second logic network 14 to I/O pads 18 in order to allow microcontroller 10 to communicate with a peripheral device is coupled to the VL bus.

Programmable logic devices (PLDs) are commonly used to implement logic networks. PLDs are general-purpose digital components which are manufactured in an "unprogrammed" state, and are later "programmed" to implement a desired logical function. A PLD is typically programmed by a sequence of electrical pulses which configure one or more arrays of programmable switching elements within the PLD. Examples of different types of PLDs include programmable read-only memories (PROMs), field programmable logic arrays (FPLAs), programmable array logic devices (PALs), and field programmable gate arrays (FPGAs). A PROM with m inputs (i.e., address inputs) and n outputs (i.e., data outputs) can be configured to perform any m-input, n-output combinational logic function. FPLAs and PALs have AND and OR arrays. The AND array performs logical AND operations upon input values and their complements, forming product terms. The OR array performs logical OR operations upon the product terms, forming output values. The AND and OR arrays of FPLAs include programmable switching elements, while only the AND arrays of PALs are programmable. FPLAs and PALs implement combinational logic functions as a sum of the product terms (i.e., a sum of products) of input values. FPGAs are semi-custom logic devices including "islands" of programmable logic blocks called "logic cells" surrounded by an interconnection network which includes programmable switching elements. The logical functions performed by the logic cells are determined by programming, as are the interconnections formed between the logic cells. FPLAs, PALs, and FPGAs may also include storage elements (e.g., flip-flops) needed to implement sequential logic circuits.

All but one of the logic networks sharing a single set of I/O pads as described above are typically inactive at any given time. Such inactive logic networks occupy valuable chip area which could be used to implement other functions.

It would thus be desirable to replace two or more logic networks which share a common set of I/O pads and the associated select logic with a single PLD capable of being configured to perform the desired logic function.

SUMMARY OF THE INVENTION

The problems outlined above are in large part solved by a microcontroller having a block of logic configurable to perform a selected logic function and to produce output signals coupled to corresponding I/O pads according to a predefined hardware interface. The microcontroller includes a central processing unit (CPU), a first set of I/O pads, and a configurable logic block (CLB) all formed upon a single monolithic semiconductor substrate. The CPU is configured to execute instructions, preferably x86 instructions. The CPU produces CPU output signals during instruction execution. The CLB is coupled between the CPU output signals and the first set of I/O pads. The CLB is configurable to perform a logic function selected from a predefined set of logic functions. Each member of the set of logic functions has an associated hardware interface including a signal table which defines a correspondence between CLB input/output signals and members of the first set of I/O pads. The microcontroller also preferably includes a test/program core coupled to a second set of I/O pads and to the CLB. The test/program core produces programming signals in response to signals received via the second set of I/O pads. The programming signals cause the CLB to perform the selected logic function. When programmed, the CLB produces CLB output signals in response to the CPU output signals. Each of the CLB output signals is coupled to one or more of the members of the first set of I/O pads according to the hardware interface of the selected logic function.

The CLB includes programmable switching elements, preferably EEPROM elements. The CLB also preferably includes storage elements (e.g., flip-flops) needed to implement sequential logic functions. In addition, the CLB preferably includes constructs used to perform Joint Test Action Group (JTAG) boundary-scan testing. The boundary-scan constructs are used to both test the CLB and to configure the CLB to perform the selected logic function.

The microcontroller also preferably includes an internal bus, a memory controller coupled to a third set of I/O pads, and an expansion bus interface coupled to a fourth set of I/O pads. The internal bus has multiple signal lines for conveying signals. The memory controller is configured to control the saving of data within and the retrieving of data from one or more memory devices coupled to the third set of I/O pads. The expansion bus interface is configured to control an expansion bus coupled to the fourth set of I/O pads. The CPU, CLB, memory controller, and expansion bus interface are coupled to the internal bus and communicate via the internal bus.

BRIEF DESCRIPTION OF THE DRAWINGS

Other objects and advantages of the invention will become apparent upon reading the following detailed description and upon reference to the accompanying drawings in which.

Figure 1:
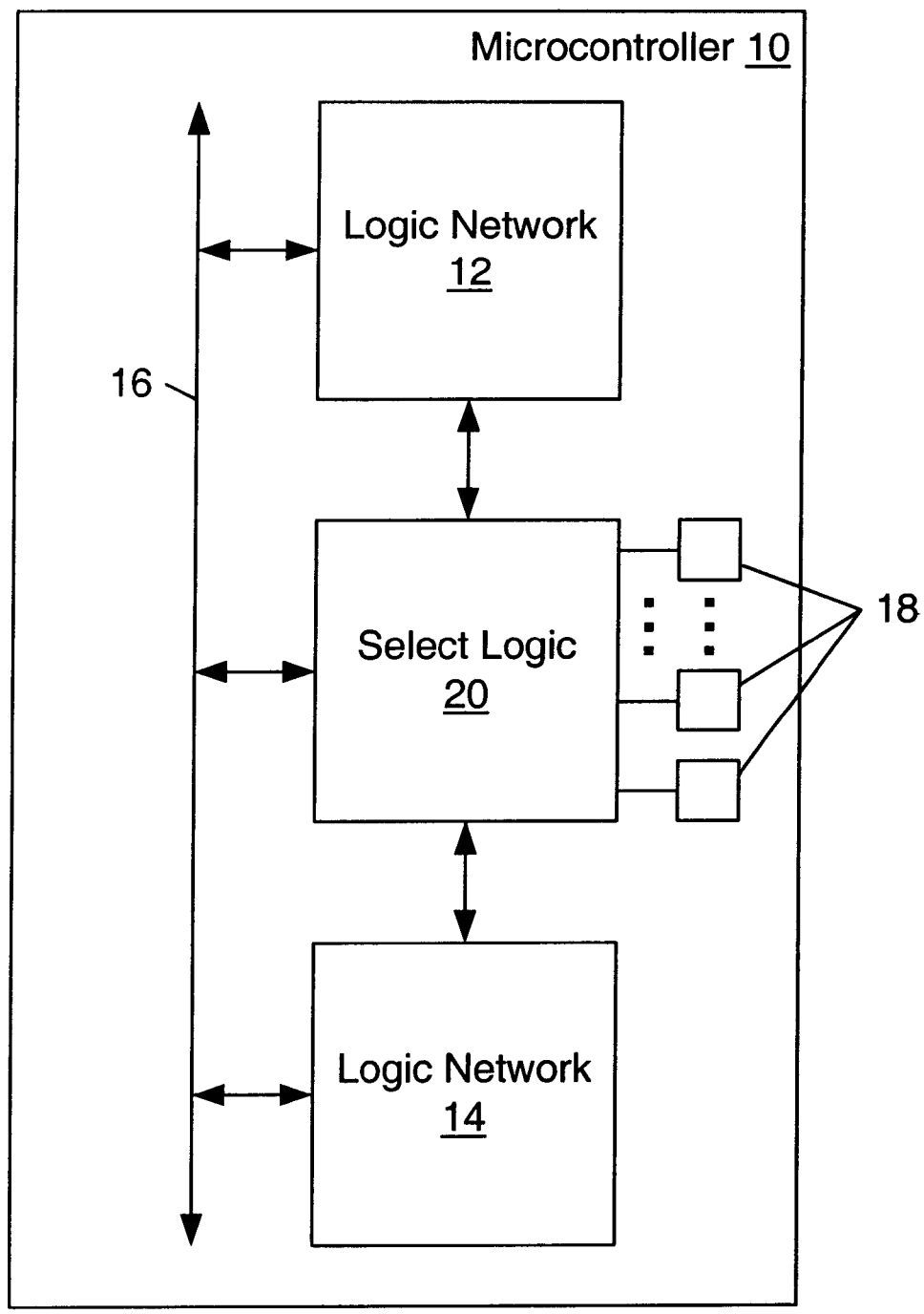
FIG. 1 is a block diagram of a prior art microcontroller which includes two logic networks sharing a common set of I/O pads via select logic.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
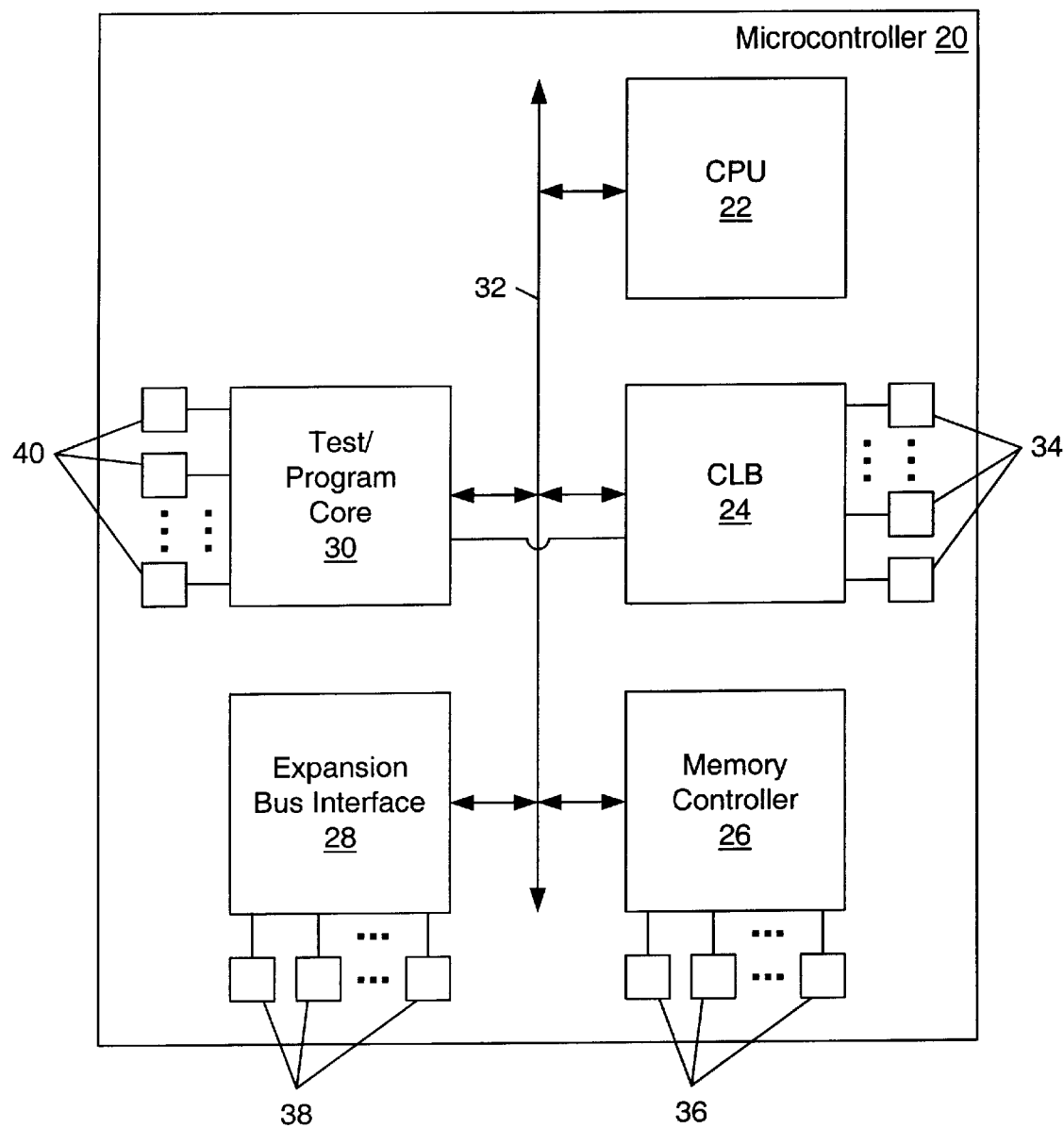
FIG. 2 is a block diagram of a preferred embodiment of a microcontroller in accordance with the present invention, wherein the microcontroller includes a configurable logic block (CLB) coupled to a set of I/O pads and configurable to perform a logic function selected from a predefined set of logic functions, wherein each member of the set of logic functions has an associated hardware interface including a signal table which defines a correspondence between output signals produced by the CLB and the I/O pads.

FIG. 2 is a block diagram of a preferred embodiment of a microcontroller 20 in accordance with the present invention. Microcontroller 20 includes a CPU 22, a configurable logic block (CLB) 24, a memory controller 26, an expansion bus interface 28, a test/program core 30, an internal bus 32, a first set of I/O pads 34, a second set of I/O pads 36, a third set of I/O pads 38, and a fourth set of I/O pads 40, all formed upon a single monolithic semiconductor substrate (i.e., chip). Internal bus 32 includes multiple signal lines for conveying signals. CPU 22, CLB 24, memory controller 26, expansion bus interface 28, and test/program core 30 are coupled to internal bus 32 and communicate with one another via signals driven upon internal bus 32. CPU 22 executes microprocessor instructions, preferably from an instruction set of an x86 microprocessor, and produces CPU output signals during instruction execution.

Following fabrication, microcontroller 20 is typically secured within a protective semiconductor device package having multiple terminals (e.g., pins). I/O pads 34, 36, 38, and 40 are typically connected to terminals of the device package by conductive traces (e.g., fine metal wires). When programmed, CLB 24 produces CLB output signals in response to CPU output signals received via internal bus 32. Each of the CLB output signals is coupled to one or more device package terminals via I/O pads 34.

CLB 24 is coupled to I/O pads 34, and includes programmable logic which is configurable to perform a selected logic function. For example, CLB 24 may be programmed to implement an LCD display driver circuit. In this case, the device package terminals corresponding to I/O pads 34 are connected to an LCD display device. The CLB output signals, coupled to the LCD display device via I/O pads 34 and the corresponding device package terminals, control the LCD display device. CLB 24 may also be programmed to implement a VL bus controller. In this case, the device package terminals corresponding to I/O pads 34 are connected to signal lines of a VL bus. CLB 24 receives input signals from, and provides output signals to, the signals lines of the VL bus via device package terminals and corresponding I/O pads 34. CLB 24 may thus communicate with one or more devices coupled to the VL bus.

CLB 24 is preferably programmed to perform a logic function selected from a predefined set of logic functions.

Each member of the set of logic functions has an associated hardware interface including a signal table which defines the correspondence between CLB input/output signals and I/O pads 34. Thus the programming of CLB 24 involves a mapping of CLB input/output signals to I/O pads 34. Table 1 below illustrates a sample signal table derived by combining signal tables for the LCD display driver and the VL bus controller functions.

TABLE 1

Sample Signal Table for LCD Display Driver/VL Bus Controller Functions.

| I/O Pad No. | Signal Name | |
|---|---|---|
| | LCD Display | VL Bus Control |
| 1 | LCDD0 | VL_RST# |
| 2 | LCDD1 | VL_ADS# |
| 3 | LCDD2 | VL_W/R# |
| 4 | LCDD3 | VL_M/IO# |
| 5 | LCDD4 | VL_LRDY# |
| 6 | LCDD5 | VL_D/C# |
| 7 | LCDD6 | VL_LDEV# |
| 8 | LCDD7 | VL_BE3# |
| 9 | M | VL_BE2# |
| 10 | LC | VL_BE1# |
| 11 | SCK | VL_BE0# |
| 12 | FRM | VL_LCLK |
| 13 | LVEE# | VL_BRDY# |
| 14 | LVDD# | VL_BLAST# |

Signal names followed by '#' are active low, meaning the signal is active or asserted when the signal voltage is low. For the LCD display driver function, 'LCDD0–7' are LCD panel picture element (i.e., pixel) data bits. 'M' is the alternating current modulation signal for the LCD panel. 'LC' is the LCD panel line clock signal indicating the beginning of a transfer of LCD panel display line data. 'SCK' is the nibble/byte strobe used by the LCD display device to latch a nibble or byte of incoming data. 'FRM' is the LCD panel frame start signal which indicates the next data element is intended for the first pixel in the first display line of the LCD panel. LVEE# is the LCD panel VEE voltage control signal used to control application of VEE voltage to the LCD panel. LVDD# is the LCD panel VDD voltage control signal used to control application of VDD voltage to the LCD panel.

For the VL bus controller function, 'VL_RST#' is the master reset signal. 'VL_ADS#' is the address strobe which indicates the start of a bus cycle. 'VL_W/R#' is the write/read status signal. 'VL_M/I/O#' is the memory/I/O status signal. 'VL_LRDY#' is asserted by a receiving (i.e., target) device coupled to the VL bus to indicate termination of the current bus cycle. 'VL_D/C#' is the data/code status signal. 'VL_LDEV#' is asserted by a target device to indicate acceptance of the current data transfer. 'VL_BE0–3#' are the byte enable signals. 'VL_LCLK' is the bus clock signal. 'VL_BRDY#' is asserted by a target device to indicate termination of a burst transfer. 'VL_BLAST#' is asserted to indicate that the next 'VL_BRDY#' signal will terminate the burst transfer currently in progress.

Memory controller 26 is coupled to I/O pads 36, and includes logic circuitry to generate signals needed to store data within or retrieval data from one or more semiconductor memory devices coupled to I/O pads 36. The memory devices may be, for example, static random access memory (SRAM) devices or dynamic random access memory (DRAM) devices. The memory devices store instructions and data used by CPU 22, and CPU 22 obtains the instructions and data via memory controller 26 and internal bus 32. Memory controller 26 preferably includes one or more configuration registers which store operating parameters of the memory devices.

Expansion bus interface 28 is coupled to I/O pads 38, and performs an interface function between microcontroller 20 and an external expansion bus. I/O pads 38 are connected to device package terminals, and the device package terminals are coupled to one or more signal lines of the external expansion bus. The external expansion bus may be an industry standard architecture (ISA) bus, an extended industry standard architecture (EISA) bus, a Micro Channel architecture (MCA) bus, or a peripheral component interconnect (PCI) bus. Microcontroller 20 may communicate with devices coupled to the external expansion bus via expansion bus interface 28.

Test/program core 30 is coupled to I/O pads 40 and to CLB 24. Test/program core 30 provides support for Joint Test Action Group (JTAG) boundary-scan testing of the circuitry of microcontroller 20. In accordance with well known JTAG boundary scan techniques, a boundary scan cell is associated with each I/O pad of microcontroller 20. The boundary scan cells are controlled by test/program core 30. In a normal operating mode, the boundary scan cells do not impede signals flowing to or from microcontroller 20 circuitry. In a test mode, test/program core 30 configures the boundary scan cells to form a serial "scan chain", and receives testing signals from an external device via I/O pads 40. Input values, received via a first I/O pad 40, are shifted through the scan chain, then applied to input signal lines of microcontroller 20. Output values, produced by output signal lines of microcontroller 20, are captured by a number of the boundary scan cells and shifted out through the scan chain and a second I/O pad 40. Test/program core 30 preferably provides support for JTAG boundary-scan testing in accordance with IEEE Standard 1149.1-1990.

Test/program core 30 also provides a means of both testing CLB 24 in isolation and programming CLB 24 to perform a selected logic function. In CLB test and program modes, test/program core 30 directs signals received from an external device via I/O pads 40 to CLB 24.

Figure 3:
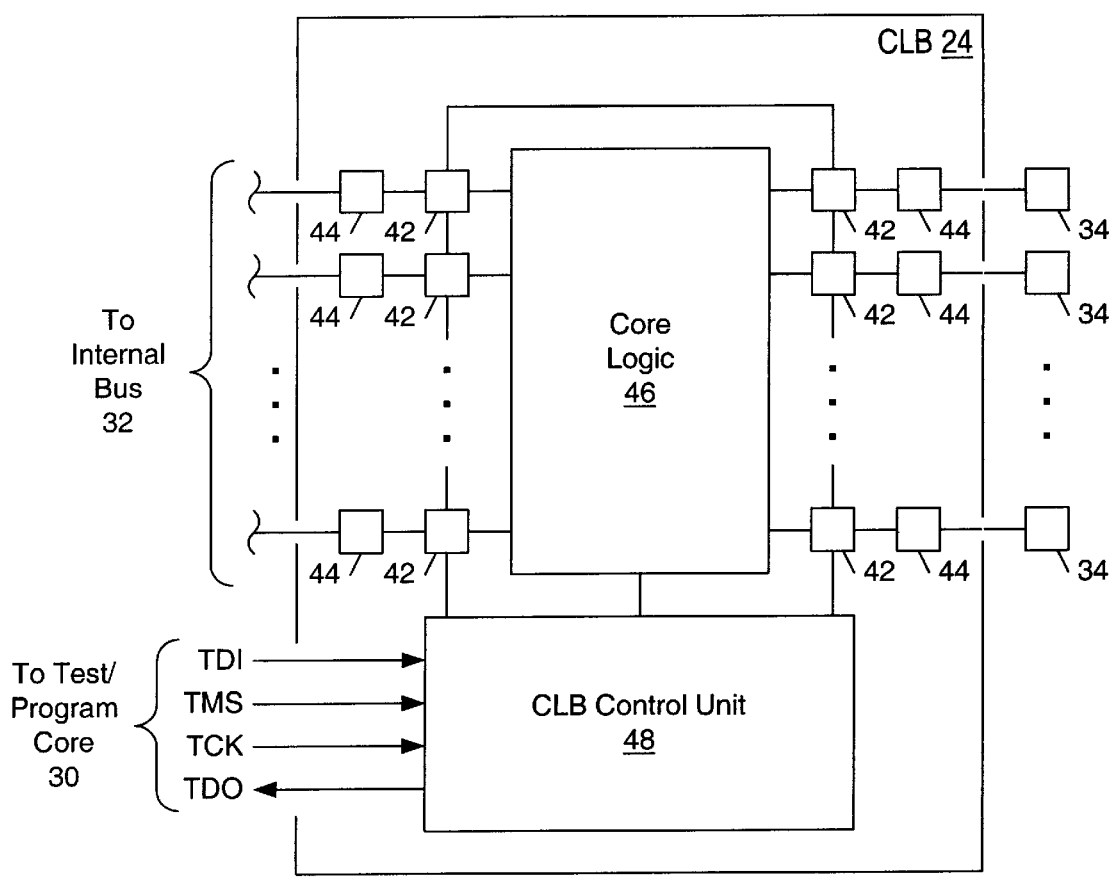
FIG. 3 is a block diagram of a preferred embodiment of the CLB of FIG. 2, wherein the CLB includes a core logic and boundary-scan testing constructs used to both test the CLB and to configure the CLB to perform the selected logic function.

FIG. 3 is a block diagram of a preferred embodiment of CLB 24. CLB 24 is configured to facilitate JTAG boundary-scan testing, preferably according to IEEE Standard 1149.1-1990. Constructs of the testing architecture are also used to configure the programmable logic within CLB 24 to perform a selected function. CLB 24 includes multiple boundary scan cells 42 inserted between corresponding I/O buffers 44 and a core logic 46. Each boundary scan cell 42 is coupled to a CLB control unit 48 which controls the boundary scan cell 42. In a normal operating mode, signals flow to and from core logic 48 via boundary scan cells 42 unimpeded. In a testing mode and a programming mode, CLB control unit 48 configures boundary scan cells 42 to form a serial "scan chain" surrounding core logic 46. Input values, received from an external device via test/program core 30, are shifted through the scan chain, then applied to input signal lines of core logic 46. In the testing mode, output values produced by core logic 46 are captured by a number of the boundary scan cells 42 and shifted out through the scan chain. The output values are provided to the external device via test/program core 30. In the programming mode, the input signals applied to core logic 46 are used to configure programmable switching elements within core logic 46. As a result, core logic 46 is caused to implement the selected logic function.

Core logic 46 of CLB 24 includes programmable switching elements, preferably EEPROM switching elements. The programmable logic within core logic 46 preferably includes storage elements (e.g., flip-flops) needed to implement sequential logic functions.

It will be appreciated to those skilled in the art having the benefit of this disclosure that this invention is believed to be a microcontroller including a configurable logic block (CLB) coupled to a set of I/O pads and configurable to perform a logic function selected from a predefined set of logic functions, wherein each member of the set of logic functions has an associated hardware interface which defines a correspondence between CLB input/output signals and the I/O pads. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A microcontroller formed upon a single monolithic semiconductor substrate, comprising:
   a CPU configured to execute instructions and to produce a plurality of CPU output signals during instruction execution;
   a plurality of I/O pads
   a configurable logic block (CLB) coupled to receive the plurality of CPU output signals and coupled to the plurality of I/O pads, wherein the CLB is configurable to: (i) produce a plurality of CLB output signals in response to the plurality of CPU output signals in accordance with a programmable configuration of said CLB, and (ii) direct the CLB output signals to respective said I/O pads in accordance with a predefined hardware interface attributed to the programmable configuration; and
   programming hardware coupled to the CLB for programming the CLB such that the programmable configuration of the CLB is achieved.

2. The microcontroller as recited in claim 1, wherein the specific said programmable configuration is a logic function selected from a predefined set of logic functions, and wherein each member of the set of logic functions has a corresponding predefined hardware interface.

3. The microcontroller as recited in claim 2, wherein the programming hardware comprises a test/program core configured to produce programming signals which program the CLB such that the programmable configuration of the CLB is achieved.

4. The microcontroller as recited in claim 1, wherein said predefined hardware interface comprises a signal table which defines a correspondence between each of said plurality of CLB output signals and each of said plurality of I/O pads.

5. The microcontroller as recited in claim 1, wherein the CLB is a contiguous block of configurable logic coupled between the plurality of CPU output signals and the plurality of I/O pads.

6. The microcontroller as recited in claim 5, wherein the CLB includes a plurality of programmable switching elements.

7. The microcontroller as recited in claim 6, wherein the plurality of programmable switching elements comprises electrically erasable programmable read only memory (EEPROM) elements.

8. The microcontroller as recited in claim 1, wherein the CPU is configured to execute instructions arising from an x86 instruction set.

9. A microcontroller formed upon a single monolithic semiconductor substrate, comprising:
   an internal bus having a plurality of signal lines for conveying signals;
   a CPU configured to execute instructions and to produce a plurality of CPU output signals during instruction execution;
   a first plurality of I/O pads;
   a configurable logic block (CLB) coupled between the internal bus and the first plurality of I/O pads, wherein the CLB is configurable to perform a logic function selected from a predefined set of logic functions, and wherein each member of the predefined set of logic functions has a corresponding hardware interface;
   a second plurality of I/O pads; and
   a test/program core coupled to the second plurality of I/O pads and to the CLB, wherein the test/program core is configured to produce programming signals in response to signals received via the second plurality of I/O pads;
   wherein the CLB is configured to perform a selected logic function by the programming signals, and wherein the configured CLB produces a plurality of CLB output signals in response to the plurality of CPU output signals such that each of the plurality of CLB output signals is coupled to one or more of the first plurality of I/O pads according to the hardware interface of the selected logic function.

10. The microcontroller as recited in claim 9, wherein the CPU is configured to execute instructions arising from an x86 instruction set.

11. The microcontroller as recited in claim 9, wherein the CLB is a contiguous block of configurable logic coupled between the internal bus and the first plurality of I/O pads.

12. The microcontroller as recited in claim 11, wherein the CLB includes a plurality of programmable switching elements.

13. The microcontroller as recited in claim 12, wherein the plurality of programmable switching elements comprises electrically erasable programmable read only memory (EEPROM) elements.

14. The microcontroller as recited in claim 9, wherein the hardware interface of each of the predefined set of logic functions comprises a signal table which defines a correspondence between the CLB output signals and the first plurality of I/O pads.

15. The microcontroller as recited in claim 9, further comprising:
   a third plurality of I/O pads; and
   a memory controller coupled to the internal bus and to the third plurality of I/O pads, wherein the memory controller is configured to control the saving of data within and the retrieving of data from one or more memory devices coupled to the third plurality of I/O pads.

16. The microcontroller as recited in claim 9, further comprising:
   a third plurality of I/O pads; and
   an expansion bus interface coupled to the internal bus and to the third plurality of I/O pads, wherein the expansion bus interface is configured to control an expansion bus coupled to the third plurality of I/O pads.

17. A microcontroller formed upon a single monolithic semiconductor substrate, comprising:
   an internal bus having a plurality of signal lines for conveying signals;
   a CPU coupled to the internal bus and configured to execute instructions, wherein the CPU produces a plurality of CPU output signals during instruction execution;

a first plurality of I/O pads;

a configurable logic block (CLB) coupled between the internal bus and the first plurality of I/O pads, wherein the CLB is configurable to perform a logic function selected from a predefined set of logic functions, and wherein each member of the predefined set of logic functions has a corresponding hardware interface;

a second plurality of I/O pads;

a test/program core coupled to the second plurality of I/O pads and to the CLB, wherein the test/program core is configured to produce programming signals in response to signals received via the second plurality of I/O pads;

a third plurality of I/O pads;

a memory controller coupled to the internal bus and to the third plurality of I/O pads, wherein the memory controller is configured to control the saving of data within and the retrieving of data from one or more memory devices coupled to the third plurality of I/O pads;

a fourth plurality of I/O pads; and an expansion bus interface coupled to the internal bus and to the fourth plurality of I/O pads, wherein the expansion bus interface is configured to control an expansion bus coupled to the fourth plurality of I/O pads;

wherein the CLB is configured to perform a selected logic function by the programming signals, and wherein the configured CLB produces a plurality of CLB output signals in response to the plurality of CPU output signals such that each of the plurality of CLB output signals is coupled to one or more of the first plurality of I/O pads according to the hardware interface of the selected logic function.

18. The microcontroller as recited in claim 17, wherein the hardware interface of each of the predefined set of logic functions comprises a signal table which defines a correspondence between the CLB output signals and the first plurality of I/O pads.

19. The microcontroller as recited in claim 17, wherein the CPU is configured to execute instructions arising from an x86 instruction set.

20. The microcontroller as recited in claim 17, wherein the CLB is a contiguous block of configurable logic coupled between the internal bus and the first plurality of I/O pads.

21. A microcontroller, comprising:

a CPU configured to execute instructions and to produce a plurality of CPU output signals during instruction execution;

a plurality of I/O pads;

a configurable logic block (CLB) coupled to receive the plurality of CPU output signals and coupled to the first plurality of I/O pads, wherein the CLB is configurable to perform a logic function selected from a predefined set of logic functions, and wherein each member of the predefined set of logic functions has a corresponding hardware interface; and programming hardware coupled to the CLB for configuring the CLB to perform the selected logic function.

22. The microcontroller as recited in claim 21, wherein the configured CLB produces a plurality of CLB output signals in response to the plurality of CPU output signals such that each of the plurality of CLB output signals is coupled to one or more of the first plurality of I/O pads according to the hardware interface of the selected logic function.

23. The microcontroller as recited in claim 21, wherein the CPU is configured to execute instructions arising from an x86 instruction set.

24. The microcontroller as recited in claim 21, wherein the programming hardware comprises a test/program core configured to produce programming signals which configure the CLB to perform the selected logic function.

25. A microcontroller, comprising:

a CPU configured to execute instructions and to produce a plurality of CPU output signals during instruction execution;

a first plurality of I/O pads;

a configurable logic block (CLB) coupled to receive the plurality of CPU output signals and coupled to the first plurality of I/O pads, wherein the CLB is configurable to perform a logic function selected from a predefined set of logic functions, and wherein each member of the predefined set of logic functions has a corresponding hardware interface;

a second plurality of I/O pads; and programming hardware coupled to the second plurality of I/O pads and to the CLB, wherein the programming hardware is configured to produce programming signals in response to signals received via the second plurality of I/O pads, and wherein the programming signals configure the CLB to perform the selected logic function.

26. The microcontroller as recited in claim 25, wherein the configured CLB produces a plurality of CLB output signals in response to the plurality of CPU output signals such that each of the plurality of CLB output signals is coupled to one or more of the first plurality of I/O pads according to the hardware interface of the selected logic function.

27. The microcontroller as recited in claim 25, wherein the CPU is configured to execute instructions arising from an x86 instruction set.

28. The microcontroller as recited in claim 25, wherein the programming hardware comprises a test/program core.

* * * * *